3,009,760
PROCESS FOR COLORING SHAPED STRUCTURES OF POLYOLEFINS AND COPOLYMERS OF OLEFINS

Hans-Joachim Lenz, Frankfurt am Main, Germany, assignor to Farbwerke Hoechst Aktiengesellschaft vormals Meister Lucius & Brüning, Frankfurt am Main-Hoechst, Germany, a company of Germany
No Drawing. Filed Apr. 8, 1958, Ser. No. 727,031
Claims priority, application Germany Apr. 11, 1957
7 Claims. (Cl. 8—4)

The present invention relates to a process for coloring shaped structures of polyolefins and copolymers of olefins. It is known that polyolefins and copolymers of olefins can be dyed with soluble dyestuffs, for example the so-called fat-soluble dyestuffs. The dyeing can be effected by adding the dyestuffs in the course of a plasticization or by subsequently introducing them by means of solvents that swell the shaped structure and thus penetrated into it. The dyeing may of course also be carried out subsequently in the hot and in the dry way.

Dyeings, printings and paintings of this kind have the disadvantage that the dyestuffs used and which apparently have very poor affinity for the polyolefins tend to bloom strongly, to migrate and to run (bleed).

The present invention provides a process for coloring shaped structures of macromolecular substances, i.e. homo- and copolymers of olefins containing 2 to 6 carbon atoms. According to this process a fat-soluble dyestuff is dissolved in a dyeing assistant, the solution of dyestuff and assistant thus obtained is applied to the polyolefin and then incorporated with it by heating. As dyeing assistants there are selected those that are solid at room temperature, that soften at an elevated temperature and that, when heated, swell the polyolefin and penetrate thereinto. The temperature at which the said mixture of dyestuff and assistant is incorporated with the polyolefin is below the crystallite melting point of the polyolefin, but above the melting point of the assistant.

In the process of the present invention there may be used synthetic or natural assistants.

As a dyeing assistant that is suitable as carrier in the introduction of the dyestuff into the polyolefin there may be mentioned the so-called chloro-diphenyl resin which is obtained by the chlorination of molten diphenyl or a higher polyphenyl in the presence of catalysts (cf. Hackert, "Neues Rezeptbuch," 1952, page 79).

Further dyeing assistants that are suitable as carriers in the introduction of the dyestuff into the polyolefin are chlorinated naphthalenes such as 1,8-dichloronaphthalene melting at 88° C. and 2,3-dichloro-naphthalene melting at 120° C. For the present purpose there may also be used industrially available mixtures of chlorinated naphthalenes which melt, for example, at 88° C.

When assistants of this kind are applied for incorporating the fat-soluble dyestuff with the polyolefin the blooming and running of the dyestuff are avoided so that dyeings of high quality are obtained. The dyestuff is incorporated with the polyolefin in a concentration of 2 to 5% calculated on the assistant used as carrier. When low pressure polyethylene is to be colored the dyestuff is incorporated at a temperature within the range of 110 to 120° C. whereas when low pressure polypropylene is to be colored a temperature within the range of 140 to 150° C. is applied. Depending on the thickness of the polyolefin to be colored the aforesaid heating lasts 3 to 10 minutes.

As fat-soluble dyestuffs of various tints the following compounds may, for example, be used:

Blue:
  1-methylamino-4-para-toluido-anthraquinone
Red:
  Amino-azo-xylene→β-naphthol
Yellow:
  Diphenylene→para-isohexyl-phenol
Brown:
  1-amino-4-ethoxybenzene→1-hydroxy-naphthalene
Grey:
  Aniline→α - naphthylamine→acetonyl - 1,8 - naphthalene-diamine.

According to the present invention dyeings and printings that do not swell the polyolefin at room temperature and penetrate thereinto can be applied to the shaped structures by way of the dyed assistant that is dissolved in a solvent such as acetone or an ester of an aliphatic alcohol, for example, methyl acetate, ethyl acetate or butyl acetate, or a glycol ether, for example diethylene-glycol - monobutyl ether, diethylene - glycol - monoethyl ether, or benzyl alcohol. Consequently, no dyeing is produced in the beginning. It is only by a heat treatment effected at a temperature above the softening point of the assistant and below the crystallite melting point of the polyolefin treated that the assistant carrying the dyestuff penetrates into the polyolefin. Misprints and the like can be removed without difficulty. After the fixation the resistance to scratching and abrasion of the dyeings is, on the other hand, equal to that of the olefin itself since the dyeings penetrate deep into the polyolefin while swelling it. If a film of excess resin adheres to the surface of the polyolefin it can easily be removed therefrom afterwards.

Furthermore, the use of the assistant facilitates the preparation of painting or printing colors suitable for use in any mode of application. The colors may be applied by way of the known intaglio printing, the known offset printing, the known sieve printing or with a brush. The consistency of the mixture of dyestuff and assistant that is necessary for reasons of printing technique in the incorporation of the mixture with the polyolefins which process is carried out in the hot, is suitably adjusted by the addition of small amounts of active, colorless or colored, filling materials, such as pyrogenetically prepared silicon dioxide, zinc oxide, chalk, or titanium dioxide.

As fat-soluble dyestuffs mentioned in the following examples there may be used the above mentioned compounds of various tints or similar fat-soluble dyestuffs.

As polyolefins there may be used in the dyeing, printing or painting process high pressure polyolefins and advantageously low pressure polyolefins.

The following examples serve to illustrate the invention but they are not intended to limit it thereto, the parts being by weight.

EXAMPLE 1

*Blue painting color to be applied to low pressure polyethylene*

4 parts of a blue fat-soluble dyestuff and 60 parts of chlorodiphenyl resin are dissolved in 40 parts of a mixed solvent consisting of esters of aliphatic alcohols boiling between 130 and 160° C. and having an evaporation value of 27 (evaporation value of ether=1), while 3 parts of pyrogenetically prepared silicon dioxide are added. The dyestuff solution thus prepared is applied to a shaped structure of low pressure polyethylene, for example, with a brush. After drying, the shaped structure is subjected to a heat treatment at 110 to 120° C. which, depending on the desired intensity, lasts from 3 to 10 minutes. Any excess of color adhering to the surface of the article can be removed by means of acetone or another solvent for chlorodiphenyl resin.

EXAMPLE 2

*Red printing color to be applied to a low pressure polyethylene*

4 parts of a red fat-soluble dyestuff and 80 parts of chlorodiphenyl resin are dissolved in 16 parts of butyl diglycol while 1 to 2 parts of pyrogenetically prepared silicon dioxide are added. The printing color thus obtained can be applied by the reprinting process to shaped structures of low pressure polyethylene. After drying the article is subjected to a heat treatment at 110 to 120° C. which, depending on the thickness of the coat of color applied and the desired intensity, lasts from 3 to 10 minutes. Any excess of color is removed as in Example 1.

EXAMPLE 3

*Yellow dip dyeing of low pressure polyethylene*

4 parts of a yellow fat-soluble dyestuff and 60 parts of chlorodiphenyl resin are dissolved in 40 parts of acetone while 3 parts of pyrogenetically prepared silicon dioxide are added. Shaped structures of low pressure polyethylene are dipped into the solution that has thus been prepared. After drying the structures are subjected to a heat treatment and, if necessary, an excess of color is removed as in Example 1.

EXAMPLE 4

*Brown painting color to be applied to polypropylene*

4 parts of a brown fat-soluble dyestuff and 60 parts of chlorodiphenyl resin are dissolved in 40 parts of a mixed solvent as used in Example 1 while 3 parts of pyrogenetically prepared silicon dioxide are added. The dyeing solution thus obtained is applied, for example, with a brush to a shaped structure of polypropylene. After drying the structure is subjected to a heat treatment at 120 to 130° C. which, depending on the intensity desired, lasts from 3 to 10 minutes. Any excess of color is removed as in Example 1.

EXAMPLE 5

*Grey printing color to be applied polypropylene*

4 parts of a black fat-soluble dyestuff and 80 parts of chlorodiphenyl resin are dissolved in 16 parts of butyl diglycol while 1 to 2 parts of pyrogenetically prepared silicon dioxide are added. The printing color thus prepared can be applied by the reprinting process to shaped structures of polypropylene. After drying the shaped structures are subjected to a heat treatment at 120 to 130° C. which, depending on the thickness of the coat of color applied and the desired intensity, lasts from 3 to 10 minutes. Any excess of color is removed as in Example 1.

EXAMPLE 6

*Grey printing color to be applied to a copolymer of 90 parts of ethylene and 10 parts of propylene*

The printing color is prepared and applied to a shaped structure of the aforesaid material as in Example 5. The shaped structure is subjected to a heat treatment for 3 to 10 minutes at 100 to 110° C. Any excess of color is removed as in Example 1.

I claim:
1. An improved process of dyeing a shaped article composed of a macromolecular polymer selected from the group consisting of polyethylene, polypropylene, and copolymers of ethylene and propylene, which comprises applying to the surface of said polymer at room temperature a solution of a fat-soluble dyestuff in a thermoplastic dyeing assistant selected from the group consisting of chlorinated diphenyl and chlorinated naphthalene, said assistant being solid at room temperature but softening when heated and, when heated above its melting point will swell the macromolecular polymer; drying the polymeric article, and then heating it to a temperature above the melting point of the dyeing assistant but below the crystallite melting point of the macromolecular polymer, whereby the thermoplastic dyeing assistant carrying the dyestuff swells said polymer and penetrates into it.

2. Process of claim 1, wherein the thermoplastic dyeing assistant is chlorodiphenyl.

3. The process of claim 1 wherein the shaped article is composed of low pressure polyethylene, and the heating step is conducted at a temperature of 110° to 120° C.

4. The process of claim 3 wherein said low pressure polyethylene article is dyed with a solution of a dyestuff in a chlorodiphenyl assistant.

5. The process of claim 1 wherein the shaped article is composed of polypropylene and is the heating step in conducting at a temperature of 120° to 150° C.

6. The process of claim 1 wherein the shaped article is composed of an ethylene-propylene copolymer and the heating step is conducted at a temperature of 100° to 110° C.

7. The process of claim 1 wherein any excess dyestuff adhering to the surface of the shaped article after the heating step is removed by means of a solvent.

References Cited in the file of this patent

UNITED STATES PATENTS

| 2,359,735 | Kienle | Oct. 10, 1944 |
| 2,394,689 | Heyman | Feb. 12, 1946 |
| 2,663,612 | Gibson | Dec. 22, 1953 |

FOREIGN PATENTS

| 600,999 | Great Britain | Apr. 23, 1958 |

OTHER REFERENCES

Canadian Textile Jour., vol. 74, No. 26, pp. 47–55 (p. 51 relied on).

Woodruff: American Dyestuff Reporter, April 22, 1946, pp. 194–197 and 204.

Rayon and Synt. Textiles, March 1949, p. 70.